Jan. 6, 1970  D. D. LOVITZ  3,487,935
BRACKET AND DISPOSABLE FILTER MEMBER FOR HOME AQUARIUMS
Filed April 21, 1969  2 Sheets-Sheet 1
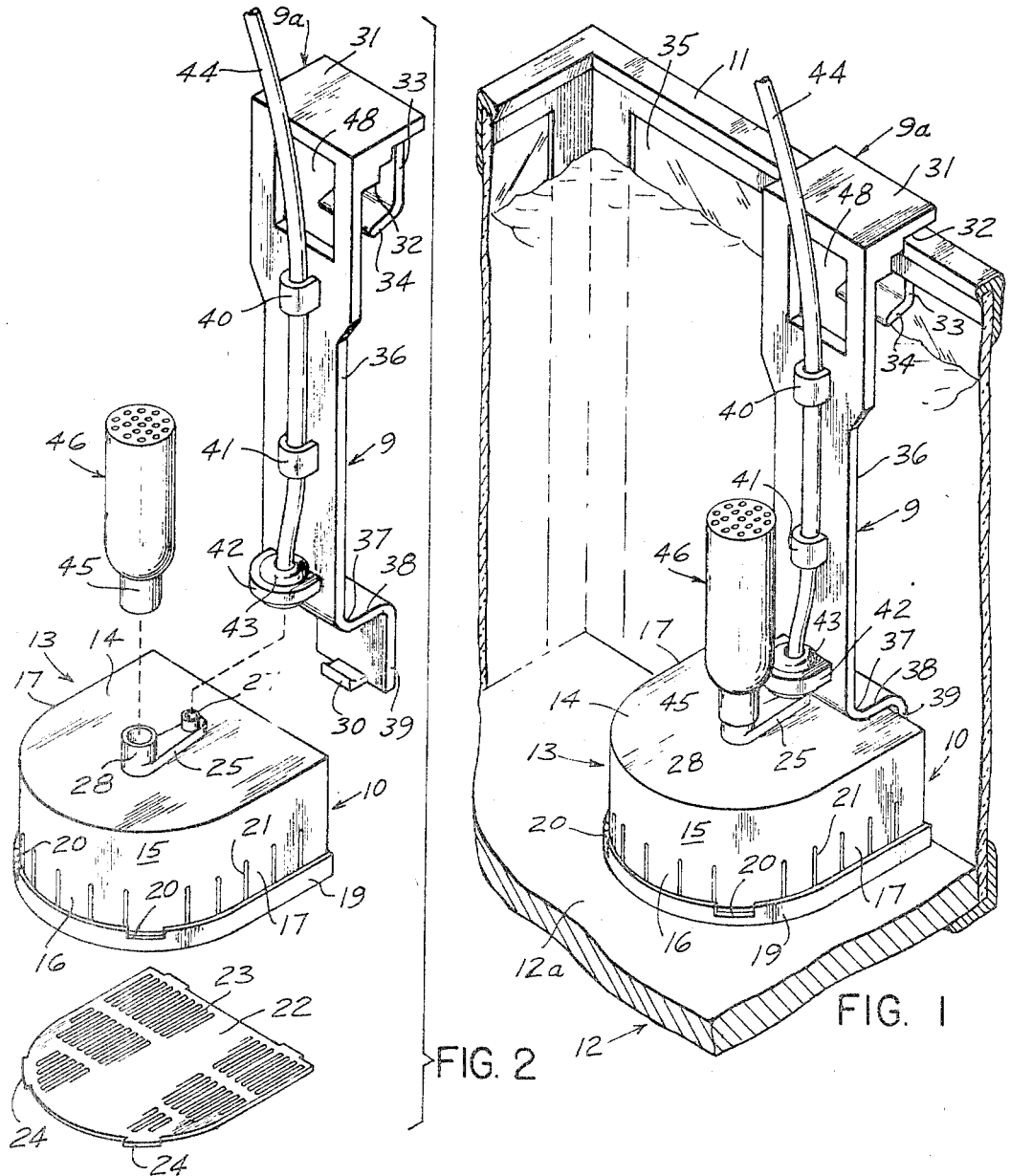
FIG. 1
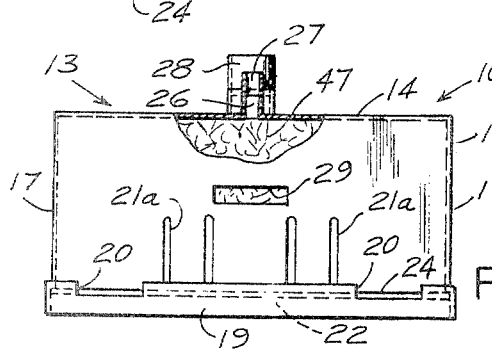
FIG. 2
FIG. 3
INVENTOR.
DAVID D. LOVITZ
ATTORNEY

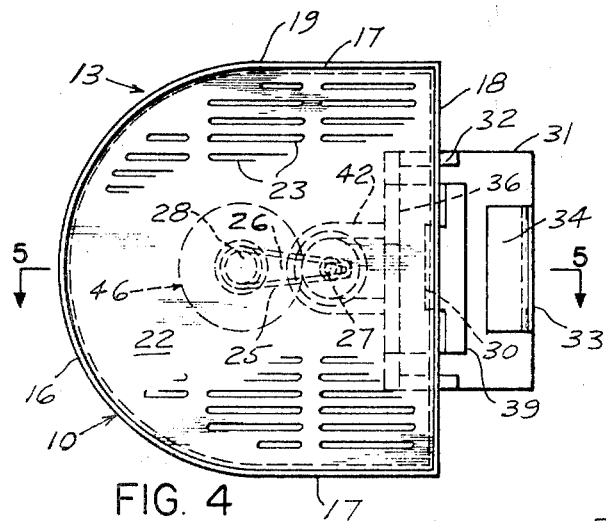
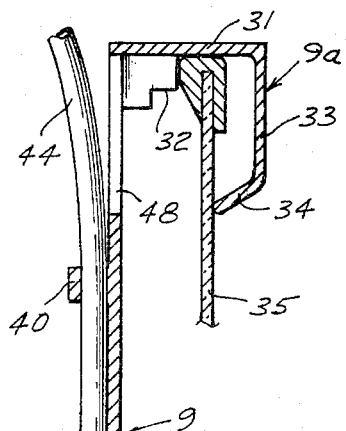
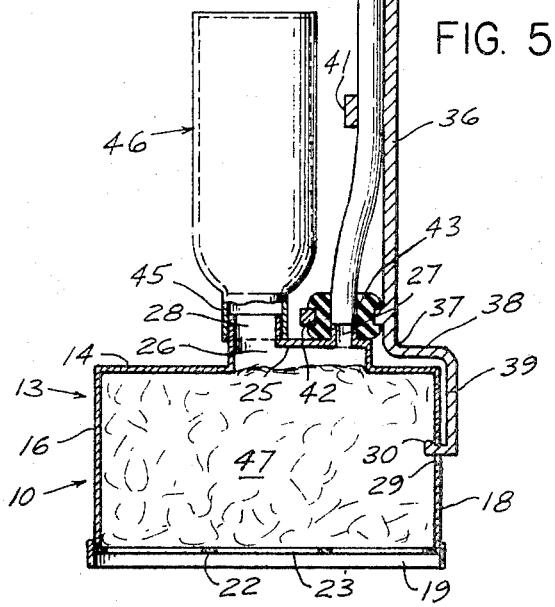

United States Patent Office 3,487,935
Patented Jan. 6, 1970

3,487,935
BRACKET AND DISPOSABLE FILTER MEMBER FOR HOME AQUARIUMS
David D. Lovitz, Short Hills, N.J., assignor to Sternco Industries, Inc., Harrison, N.J., a corporation of New Jersey
Filed Apr. 21, 1969, Ser. No. 817,804
Int. Cl. E04h 3/16
U.S. Cl. 210—169    10 Claims

ABSTRACT OF THE DISCLOSURE

A combination bracket and disposable filter member for use with home aquariums. A bracket is suspended from the rim of an aquarium so that its stem or main body portion is positioned inside of the aquarium, the bracket having at its bottom a rearwardly offset filter-supporting leg with a forwardly extending tab that releasably engages an apertured portion at the rear of a casing containing filter material. The lateral wall and floor of the casing are slotted to permit the entry of water therethrough, the top wall of the casing being raised to form a narrow channel and having water inlet and outlet pipes connected to opposite ends of the channel, so that air pumped through a tube supported by the bracket and connected to said inlet pipe will be short-circuited through said channel and out through said outlet pipe, the resulting negative pressure in the casing drawing water through said slotted walls upwardly through said filter material, to be discharged through the outlet pipe into the aquarium. When the filter is no longer usable, the entire bracket with the filter member is lifted out of the aquarium, and a new filter attached, whereafter the bracket and new filter are re-inserted in the aquarium without wetting the hands.

THE FIELD OF THE INVENTION

This invention relates to disposable filter devices for use in home aquariums, and is particularly directed to a device releasably supporting a filter member submerged in the aquarium water.

THE KNOWN ART

The most common filters for home aquariums are those which are submerged and which require inserting one's hands into the water in order both to remove a used-up filter and to re-insert a fresh one. In order to avoid such messy hand-wetting, outside filters are at times employed in which the aquarium water is pumped from the tank into an exteriorly supported filter device—an arrangement which is relatively complex in structure, requires careful maintenance and is comparatively expensive.

THE OBJECTIVES OF THE INVENTION

It is an objective of this invention to provide an effective replaceable filter device for home aquariums having none of the aforesaid shortcomings. Specifically, among the objects of this invention are the provision of a filter member operatively supported within an aquarium tank and (1) which can be replaced without the need to insert one's hands in the water, (2) which is removably supported by a bracket adapted to be suspended from the rim of the aquarium whereby both the bracket and the filter member can be readily lifted out of the tank for replacement of the filter member with a new one and readily re-inserted into the tank by simple manual manipulations (3) which when operatively submerged will be in optimum position for receiving water for filtering through an extended surface comprising the lateral walls and base of the filter device; (4) which is equipped with means effectively to draw water through filtering means by the use of simple air-feed tubing; (5) which will operatively support an auxiliary charcoal filtering cartridge at the option of the user; and (6) which is relatively simple and so inexpensive as to be disposable.

Other objects, features and advantages will appear from the drawings and the description hereinafter given.

SUMMARY OF THE INVENTION

In the preferred embodiment of this invention a disposable filter member is releasably attached to a bracket suspended from the rim of an aquarium, the bracket having an upper hooked portion in engagement with said im, an intermediate stem extending downwardly into the aquarium and a bottom filter-supporting leg rearwardly offset with respect to said stem. The said filter member comprises a casing with an upper wall, a slotted floor and an annular wall therebetween with slots along the lower region of its front, side and rear portions, the interior of the casing containing suitable filtering material.

The said filter-supporting leg has at the bottom thereof a forwardly extending tab which is proportioned for releasable engagement with an apertured portion in the rear wall of the filter casing. The proportions and positions of the bracket portions in relation to the filter member and aquarium are such that when the assembly of bracket and filter member are operatively in place in an aquarium the rear wall of the casing is spaced from the adjacent aquarium wall and the floor of the casing is spaced from the aquarium floor, whereby aquarium water is free to enter the casing through its floor and the entire lateral wall.

The upper wall of the filter casing is raised to form a narrow laterally enclosed channel, said upper wall having inlet and outlet pipes communicating with spaced portions of the channel, the inlet pipe being connected to a flexible hose, supported by the bracket stem, adapted to receive air from a suitable pump. Air from said hose enters said channel, to be short-circuited into said outlet pipe. This results in a negative pressure within the casing, whereby water is drawn through said slotted portions, upwardly through the filter material in the casing and, in purified condition, out through the outlet pipe into the aquarium.

When the filter is no longer usable, the assembly of bracket and filter member is lifted out of the aquarium and a new filter member attached. The assembly is then re-inserted in the aquarium. The said removing, filter replacement and re-inserting operations are performed without wetting the hands.

DESCRIPTION OF THE DRAWINGS

FIG. 1 is a perspective view of the bracket and disposable filter member of this invention shown operatively mounted on an aquarium tank of which a fragment is illustrated.

FIG. 2 is an exploded perspective view of the components of FIG. 1.

FIG. 3 is a rear view of the disposable filter casing adapted for removable attachment to the bracket component, a fragment being broken away for clarity.

FIG. 4 is a bottom view of the assembly of bracket and disposable casing illustrated in FIG. 1.

FIG. 5 is a vertical longitudinal section of the assembly of casing and bracket taken along 5—5 of FIG. 4.

DESCRIPTION OF PREFERRED EMBODIMENT

In the form of this invention shown in the drawings the bracket 9 in which detachable engagement with the filter member 10 is adapted to be mounted upon the upper rim 11 of the aquarium tank 12, the main body portion or stem of the bracket being disposed within the interior of the tank as shown in FIG. 1. The said disposable filter member 10 comprises a casing 13 defined by an upper wall 14, a lateral wall generally designated 15 and shown as having a rounded front portion 16, opposite flat sides 17 and a flat rear wall 18, the bottom of said lateral wall 15 having a peripheral rim 19 containing at the upper edge thereof a plurality of spaced recesses 20 for interengagement with the floor of the casing in the manner hereinbelow described. In the preferred embodiment illustrated, the said recessed portions 20 are disposed, respectively, at said rear wall 18, and between said front wall 16 and the two side walls 17. The said lateral wall 15 also contains at the lower region thereof a plurality of vertical water inlet slots 21. The base of said casing 13 consists of the flat floor 22 containing therein a plurality of slotted water inlet portions 23, said floor 22 being of a configuration like that of said rim 19 of the casing so that it will snugly fit into place. In the particular embodiment illustrated said floor 22 contains a plurality of lugs 24 positioned and proportioned to frictionally fit into the said recessed portions 20 so that the said floor will be securely maintained in engagement with said casing 13. Before the floor 22 is operatively applied to said casing filter floss or other suitable filter material is placed within the casing, the floor being pressed into place thereafter. In this construction it is preferred that the floor 22 be permanently locked in place, so that after the filter material will have outlived its usefulness the entire casing 13 can be discarded.

The said top wall 14 of the casing has a raised hollow portion 25 providing a laterally enclosed longitudinal channel 26 the rear portion of which communicates with the short pipe 27 and the forward portion of which communicates with a somewhat larger pipe 28, pipe 27 being an inlet conduit and pipe 28 an outlet conduit, as will hereinafter appear. The said rear wall 18 of the casing 13 contains an apertured portion 29 adapted to receive therein the tab 30 extending forwardly from the bottom of the bracket 9, the arrangement being such that when the bracket is operatively mounted on the rim of an aquarium it will operatively support the filter member 10.

The said bracket 9 contains at the upper portion thereof a hook 9a comprising a rearwardly extending wall 31 the underside 32 of which is of stepped configuration to enable it to fit, in known manner, over aquarium rims of various thicknesses. Extending downwardly from the wall 31 is a vertical arm 33 at the end of which is a forwardly extending finger 34. The arrangement is such that when the bracket 9 is operatively suspended from the rim 11 of the aquarium 12, the finger 34 will be in engagement with the glass panel 35 of the aquarium, so that said finger 34 and said stepped portion 32 will cooperate to maintain the bracket suspended in operative position. The intermediate stem of the bracket 9 extends downwardly from the forward end of the bracket's said top wall 31, the arrangement being such that in its operative vertical position the bottom 37 thereof will be positioned above the top flat wall 14 of the casing 13. Extending rearwardly from the bottom of the stem 36 is the horizontal wall 38 connected to the filter-supporting leg 39, the said tab 30 extending forwardly from the bottom of said leg 39 and into supporting engagement with said apertured portion 29 of the casing. The arrangement is hence such that the leg 39 is offset rearwardly with respect to the vertical stem 36, so that said leg is behind said rear wall 18 of the casing 13. The said horizontal wall 38 is so proportioned with respect to the upper wall 31 of the bracket that when the latter is operatively in place the casing 13 will be positioned with its rear wall 18 spaced forwardly from the glass panel 35 of the aquarium, thereby permitting water to enter the slots 21a at the rear of the casing; and the said tab 30 is so positioned with respect to said upper wall 31 and said casing 13 that the said floor 22 is in spaced relation to the floor 12a of the aquarium, whereby water will be permitted to enter the casing 13 through said slotted portions 23. The arrangement is hence such that the casing 13 is held in optimum position for receiving water for filtering purposes through all sides of said lateral wall 15 and the floor 22 of the filter member 10.

Extending forwardly from the front surface of the stem 36 of the bracket 9 are the two loop retainers 40 and 41; and positioned slightly above the bottom end 38 of the stem 36 is the U-shaped loop member 42 within which is disposed the resilient grommet 43. The flexible tubing 44 from an air pump (not shown) extends through said loop retainers 40 and 41 and into the grommet 43. The central aperture of the grommet is proportioned tightly to receive the bottom portion of the tubing 44, and also to receive the said short inlet pipe 27 when the casing 13 is operatively in place, as indicated in FIG. 5. The said outlet pipe 28 is adapted to receive the mouth 45 of the conventional charcoal cartridge 46, the use of said cartridge being optional.

In the operation of this device air is operatively pumped downwardly through the tubing 44, the air passing through inlet pipe 27 being short-circuited through the said channel 26 and out through the discharge pipe 28. This movement of air causes, in known manner, a negative pressure within the interior of the casing 13, whereupon water will be drawn in through the said slots 21 and 23 and upwardly through the filter material 46, whereafter the filtered water will enter and admix with the air in channel 26 and then flow outwardly through said outlet pipe 28 into the aquarium proper. The water leaving the said pipe 28 is thus purified and contains bubbles of air the oxygen of which has a purifying effect on the aquarium water. Where the cartridge 46 is employed, there is a further purification of the water.

When the filter material 47 becomes contaminated and is of no further use, the entire bracket 9 together with the supported filter member 10 are removed from the aquarium tank. Such removal is facilitated by the finger aperture 48 at the upper part of the stem 36, a finger inserted in said aperture readily enabling the entire assembly of bracket and filter member to be removed. The casing 13 is detached from the bracket 10 simply by lifting it slightly and pulling it forwardly, and a new filter member with fresh filter material can then readily be attached to the bracket and the entire assembly reinserted into the aquarium tank. Thus it is not necessary manually to reach into the water to remove the filter, as is required with conventional devices. The replacement of filter material can accordingly be quickly and neatly effected in a most convenient manner and without any messy hand-wetting.

The construction of the filter casing 13 is such that it can be readily produced as a low cost item. The bracket 9, however, is of sturdy construction and can be repeatedly re-used.

In the above description, the invention has been disclosed merely by way of example and in preferred manner; but obviously many variations and modifications may be made therein. It is to be understood, therefore, that the invention is not limited to any particular form or manner of practicing same.

I claim:

1. A bracket and disposable filter member for use within an aquarium tank, said bracket having supporting means for supporting itself within the tank and filter-supporting means detachably connected to said filter member, said filter member comprising a casing laterally defined by front, side and rear wall portions with water inlet passages therein, said casing having filter material therein, said filter-supporting means having a tab extending from said bracket, one wall portion of said casing having an apertured portion releasably interengaged with said tab, whereby said casing is detachably held in predetermined relation to said bracket, the upper portion of said casing having an inlet and an outlet pipe in spaced relation and an internally positioned channel communicating with said pipes and the interior of said casing, and air-feed tubing communicating with said inlet pipe.

2. A bracket and disposable filter member according to claim 1, said bracket's said supporting means comprising an upper hooked portion adapted for suspension from the rim of a selected aquarium tank, said bracket having an intermeidate stem and a bottom leg constituting said filter-supporting means, said tab being in angular relation to said leg.

3. A bracket and disposable filter member according to claim 2, said leg being rearwardly offset with respect to said stem, said tab being at the lower portion thereof and extending forwardly therefrom, said apertured portion of said casing being at the rear wall portion thereof.

4. A bracket and disposable filter member according to claim 3, said tab being so positioned with respect to said hooked portion and said casing as operatively to hold the casing in spaced relation above the floor of the aquarium tank from the rim of which the said bracket is operatively suspended.

5. A bracket and disposable filter member according to claim 2, said air-feed tubing being detachably connected to said inlet pipe, said bracket having thereon pipe retaining means in operative engagement with said air-feed tubing.

6. A bracket and disposable filter member according to claim 5, said pipe retaining means comprising a plurality of loops positioned in substantial longitudinal alignment on the stem of said bracket.

7. A bracket and disposable filter member according to claim 3, said bracket having a substantially horizontal wall connecting the bottom of said stem with the top of said leg, said horizontal connecting wall being spaced above the top of said casing, the upper portion of said stem having therein a finger aperture, whereby the assembly of bracket and filter member can be lifted upwardly by a finger inserted in said aperture.

8. A bracket and disposable filter member according to claim 1, said casing having a top wall, a floor and a lateral wall therebetween, said water inlet passages comprising a plurality of spaced slotted portions at the lower region of said lateral wall and in the said floor, said channel being disposed in said top wall.

9. A bracket and disposable filter member according to claim 8, said top wall having a raised hollow portion forming said channel, said inlet and outlet pipes extending upwardly from said top wall.

10. A bracket and disposable filter member according to claim 6, said inlet pipe extending upwardly from the top of said casing and being disposed adjacent said stem, the lowermost of said loops being disposed above said inlet pipe and having a grommet therein, said tubing extending into the upper portion of said grommet and said inlet pipe extending into the lower portion of said grommet.

References Cited

UNITED STATES PATENTS 3,160,588 12/1964 Alarie.
3,362,537 1/1968 Cline _____ 210—169

REUBEN FRIEDMAN, Primary Examiner

T. A. GRANGER, Assistant Examiner

U.S. Cl. X.R.

119—5